United States Patent [19]

Brosh

[11] Patent Number: 5,077,528
[45] Date of Patent: Dec. 31, 1991

[54] TRANSIENT FREE HIGH SPEED COIL ACTIVATION CIRCUIT AND METHOD FOR DETERMINING INDUCTANCE OF AN INDUCTOR SYSTEM

[75] Inventor: Amnon Brosh, Montvale, N.J.

[73] Assignee: Borg-Warner Automotive Electronic & Mechanical Systems Corporation, Sterling Heights, Mich.

[21] Appl. No.: 517,908

[22] Filed: May 2, 1990

[51] Int. Cl.$^5$ .................. G01R 27/26; G01B 7/14; H03K 5/26; H03K 3/00

[52] U.S. Cl. .................. 324/655; 307/308; 324/207.16; 324/207.24; 324/236; 328/1; 331/65; 340/870.31

[58] Field of Search .................. 324/207.16, 207.18, 324/207.19, 207.24, 236, 652, 655, 682; 340/870.13, 870.14, 870.31, 870.32, 870.33, 870.34, 870.35, 870.36, 686; 331/65; 307/234, 308, 515; 328/1, 5

[56] References Cited

U.S. PATENT DOCUMENTS

| | | |
|---|---|---|
| 3,551,649 | 12/1970 | Weber . |
| 3,742,487 | 6/1973 | Tripp . |
| 3,745,475 | 7/1973 | Turner . |
| 3,747,083 | 7/1973 | Coia . |
| 4,016,558 | 4/1977 | Bishop et al. . |
| 4,053,849 | 10/1977 | Bower et al. . |
| 4,136,335 | 1/1979 | Tompsett . |
| 4,150,573 | 4/1979 | Iinuma et al. . |
| 4,201,911 | 5/1980 | Dering . |
| 4,349,746 | 9/1982 | Grossner et al. . |
| 4,389,637 | 6/1983 | Rzeszewski . |
| 4,503,922 | 3/1985 | Brosh et al. . |
| 4,583,856 | 4/1986 | Moore . |
| 4,637,265 | 1/1987 | Fiori, Jr. . |
| 4,644,570 | 2/1987 | Brosh et al. . |
| 4,663,589 | 5/1987 | Fiori, Jr. . |
| 4,709,224 | 11/1987 | Fiori, Jr. . |
| 4,777,436 | 10/1988 | Fiori, Jr. . |
| 4,804,960 | 2/1989 | Fernandes et al. . |
| 4,807,264 | 2/1989 | Bauer . |
| 4,816,704 | 3/1989 | Fiori, Jr. . |
| 4,833,919 | 5/1989 | Saito et al. . |
| 4,841,245 | 6/1989 | Fiori, Jr. . |
| 4,851,770 | 7/1989 | Fiori, Jr. . |
| 4,875,007 | 10/1989 | Ginns .................. 324/236 X |

OTHER PUBLICATIONS

"A 16-Bit A-D-A Conversion System for High-Fidelity Audio Research", *IEEE Transactions on Acoustics, Speech, and Signal Processing*, vol. ASSP-23, No. 1, Feb. 1975.

*Primary Examiner*—Gerard R. Strecker
*Attorney, Agent, or Firm*—Harness, Dickey & Pierce

[57] ABSTRACT

The inductors in a switched resonant circuit are alternately connected in make before break fashion to ensure that at least one inductor is always connected to the tank circuit. This avoids switching discontinuities caused by signal propagation delay. By connecting both coils together between individual coil reading cycles, transients are absorbed.

9 Claims, 4 Drawing Sheets

1/2 PERIOD OVERLAP

TRANSIENT FREE HIGH SPEED COIL ACTIVATION CIRCUIT AND METHOD FOR DETERMINING INDUCTANCE OF AN INDUCTOR SYSTEM

BACKGROUND AND SUMMARY OF THE INVENTION

The present invention relates generally to noncontact sensors and to an apparatus and method for selectively energizing and de-energizing inductors in a system which enables the use of low cost digital circuitry to provide a transient free output waveform. The invention may be used in a switched complementary sensor coil application in which the coil inductances vary in response to position of a moving member.

Noncontacting sensors typically consist of two or more tunable inductors each. Although circuit configurations vary, usually the tunable inductive element is connected alternatively to a capacitor to form a resonant tank circuit. Typically, two complementary inductor coils are used in a switched arrangement.

In the conventional switched arrangement a first coil is connected to the tank circuit and energized while a frequency measurement is taken. Thereafter, the first coil is disconnected and a second coil is simultaneously connected to the tank circuit where a second frequency measurement is taken. Switching from one coil to the other in this fashion using digital switching techniques results in transients, which are a source of error. This includes an arrangement whereby the coils are multiplexed at a task repetition rate.

The present invention provides a substantial transient reduction during coil switching using a staggered coil activation technique. The technique allows the coils to be multiplexed after no longer than one period, affording a system with much better frequency response than is possible using conventional switching techniques. The invention is well adapted to implementations using low cost, high speed digital components. The staggered technique offers a system which is quite tolerant to variations in signal propagation delays common in digital circuit components. In other words, unlike conventional switching techniques, the invention is able to properly function even if the signal for energizing the first coil and the signal for de-energizing the second coil propagate through different circuit paths and therefore have different arrival times.

The present inventive method may be used to indicate the inductance of a system of inductors which includes a first inductor and a second inductor, for example. The inductance may be correlated to a measured parameter such as position of a tuning slug or tuning plate. Hence, the invention is applicable to a wide range of different parameter sensors.

The method comprises coupling the first inductor to a tank circuit and thereafter supplying energy to the tank circuit to cause oscillation at a first resonant frequency which is determined at least in part by the first inductor. A waveform indicative of the first resonant frequency is produced in this fashion. Next, the second inductor is coupled to the tank circuit without decoupling the first inductor from the tank circuit, resulting in a coil overlap period. Thereafter, the first inductor is decoupled from the tank circuit, without decoupling the second inductor. Energy is then supplied to the tank circuit to cause oscillation at a second resonant frequency which is determined by the second inductor followed again by a coil overlap period. A waveform indicative of the second resonant frequency is thus produced. The waveforms indicative of the first and second resonant frequencies produced in this fashion are indicative of the coil inductance.

The invention affords numerous advantages over conventional switching techniques. It ensures that at least one coil is always connected in the tank circuit, thereby avoiding errors resulting from discontinuities. Only one coil changes status at a given time, never both at once allowing for smooth transitioning. Further, the coil being read is not subject to change during its entire measurement cycle, allowing a transient free measurement. Also, by connecting both coils together between individual coil reading cycles all transients are absorbed.

For a more complete understanding of the invention and its further objects and advantages, reference may be had to the following specification and to the accompanying drawings.

DESCRIPTION OF THE PREFERRED EMBODIMENTS

Figure 1:
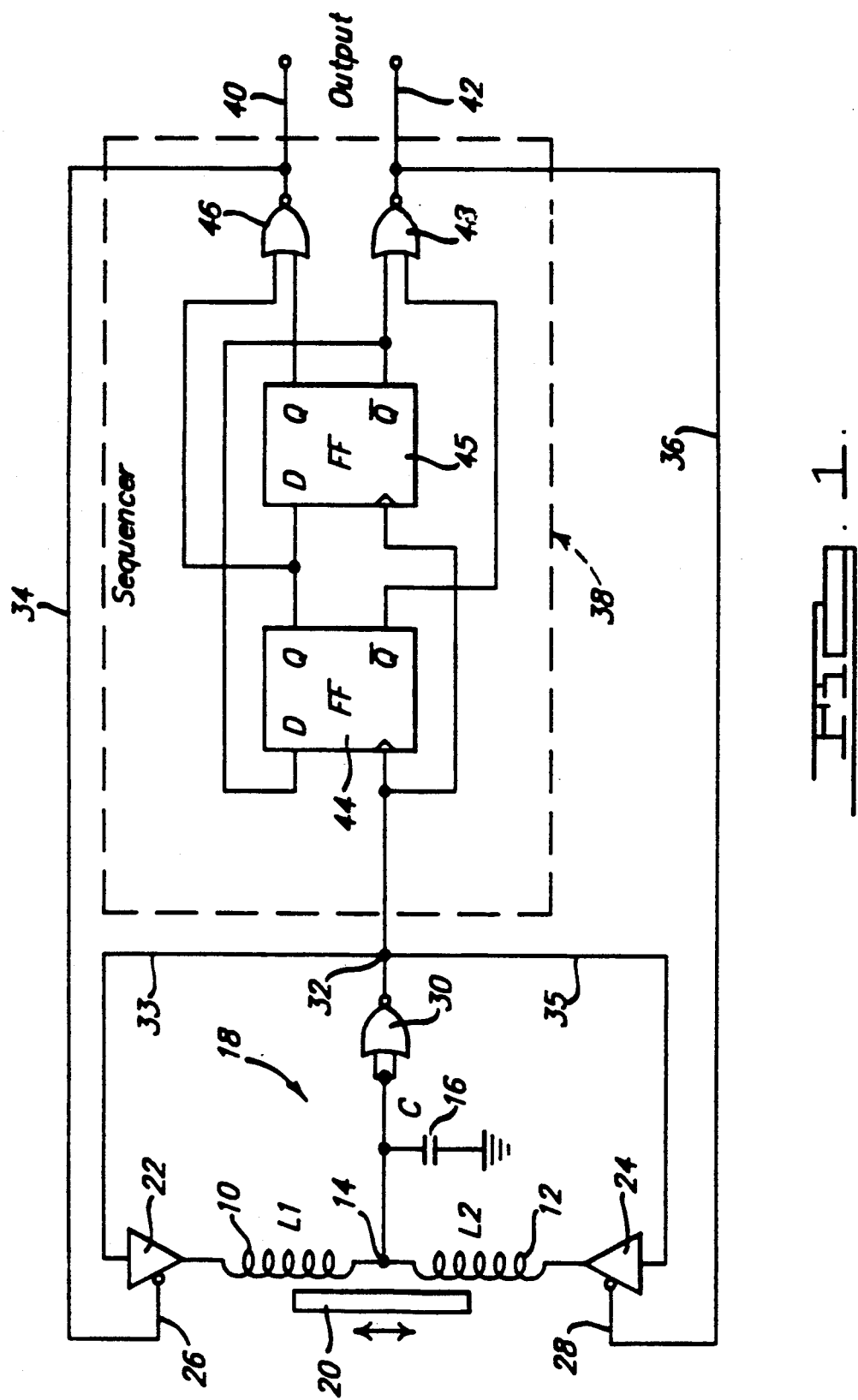
FIG. 1 a schematic block diagram of a first embodiment of the invention.

Referring to FIG. 1, a first embodiment of the invention is implemented using a first inductor 10 and a second inductor 12, joined at node 14 and connected to capacitor 16 to define a tank circuit, designated generally at 18. A moving vane tuning plate or slug 20 alters the inductance of inductors 10 and 12 in a complementary fashion. Movement of the tuning plate in one direction increases the inductance of inductor 10 while decreasing the inductance of inductor 12. Movement in the opposite direction has the opposite effect, namely increasing the inductance of inductor 12 while decreasing the inductance of inductor 10. Each inductor is coupled to a tristate buffer 22 and 24. The buffers function as electronically actuated switches. The tristate buffers switch between a high impedance (open circuit) state and a low impedance (closed circuit) state in response to signals on the respective control terminals 26 and 28. In the closed circuit state, the associated inductor coil is connected to the output of NOR gate 30 at node 32. In the open circuit state, the associated inductor is effectively disconnected from the circuit.

NOR gate 30 operates essentially as an oscillator with the resonant frequency of tank circuit 18 determining the oscillation frequency. Feedback on lines 33 or 35 establishes the oscillation condition.

The output of NOR gate 30 at node 32 is connected to the sequencer unit 38 which provides output signals at terminals 40 and 42 and which also provides the control signals via lines 34 and 36 to control terminals 26 and 28. The sequence may be constructed using a relatively simple digital circuit consisting of a small number of digital circuit components as well as programmable array logic (PAL) technology, suitably programmed microprocessor circuits or the like. For illustration purposes sequencer 38 has been shown in FIG. 1 as comprising flip-flops 44 and 45 and NOR gates 46 and 48. The basic function of sequencer 38 is to stagger the selection of inductors 10 and 12 in an overlapping, "make before break" configuration.

Figure 2:
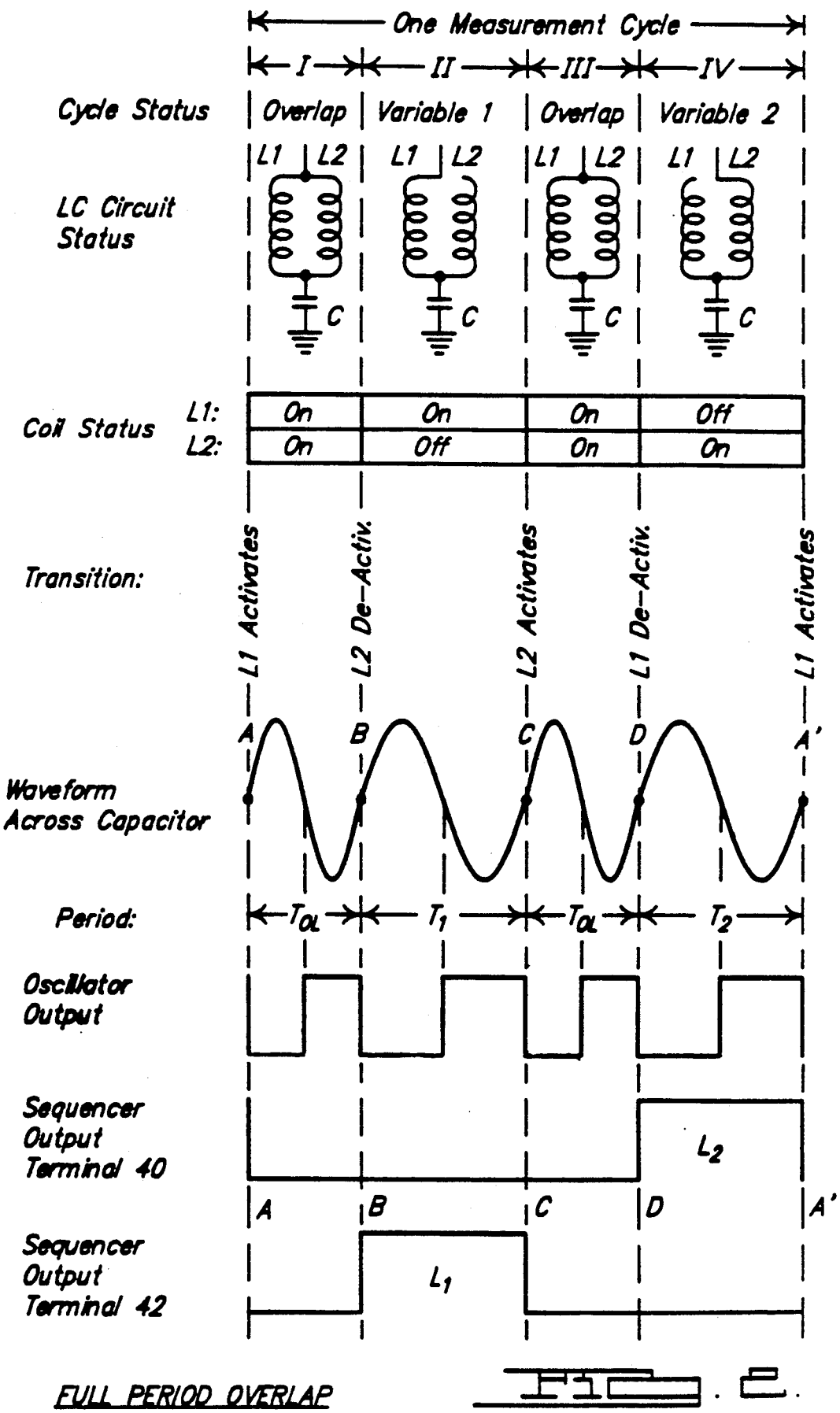
FIG. 2 is a series of waveform diagrams depicting the operation of the embodiment of FIG. 1.

For a better understanding of the operation of sequencer 38, refer to FIG. 2. FIG. 2 depicts inductors 10 and 12 and capacitor 16 in a sequence of different states of interconnection over different time intervals. Specifically, FIG. 2 depicts one measurement cycle comprising time intervals I-IV. During the time interval designated I inductors 10 and 12 are connected in parallel, with the parallel combination connected in series with capacitor 16 forming a tank circuit. The inductors are in an overlapping state during the time interval I. In time interval II inductor 10 is connected in series with capacitor 16 in the tank circuit, but inductor 12 is not. In this second configuration only the inductor 10 contributes to the resonant frequency of the tank circuit. In time interval III both inductors are again connected in parallel and thus represent the same state as illustrated in time interval I. In time interval IV inductor 12 is connected in series with capacitor 16, while inductor 10 is disconnected. In this state only inductor 12 contributes to the resonant frequency of the tank circuit.

For convenience the status of inductors 10 and 12 ("Coil Status") for each of the time intervals is stated as either ON or OFF, ON meaning operably connected to the tank circuit and OFF meaning operably disconencted from the tank circuit. As seen from FIG. 2 each inductor is selectively activated and deactivated to produce the staggered relationship of the invention. The transitions from activated to deactivated states occur at the times indicated as "Transition."

By activating the inductors in this fashion discontinuities and switching transients are eliminated. This can be seen by monitoring the waveform across capacitor 16, which is also shown in FIG. 2. It is seen that the frequency of oscillation for any given time interval depends upon the total inductance at that time connected to the tank circuit. In this regard, assuming no movement of tuning plate 20 occurs between time intervals I and III, the frequency or period of oscillation at intervals I and III will be identical. The frequencies or periods at time intervals II and IV will depend upon the actual inductance values of inductors 10 and 12, respectively.

In practice, inductors 10 and 12 are complementary. If L1 and 2 are the inductances of inductors 10 and 12, respectively, and if L0 is the inductance of both inductors when the tuning plate is at symmetry with respect to the inductors, and if $\Delta L$ is the change in inductance due to movement of the tuning plate from the symmetry point, the following relationships exist:

$$L1 = L0 + \Delta L$$

$$L2 = L0 \Delta L.$$

When the two inductors are activated in parallel (as during time intervals I and III) the equivalent inductance Le is as follows:

$$Le = \frac{L1 \cdot L2}{L1 + L2} = \frac{(L0 + \Delta L) \cdot (L0 - \Delta L)}{(L0 + \Delta L) + (L0 - \Delta L)} =$$

-continued $$\frac{(L0)^2 - (\Delta L)^2}{2L0} = \frac{L0}{2}\left[1 - \left(\frac{\Delta L}{L0}\right)^2\right]$$

For relatively small changes in inductance with respect to the nominal inductance at the symmetry point, namely for relatively small $\Delta L/L0$ (i.e., up to 0.05 at full scale) the value of Le can be approximated by:

$$Le \approx L0/2.$$

As can be seen, Le is independent of $\Delta L$ for relatively small $\Delta L/L0$ and remains constant irrespective of the position of the tuning plate. This makes it possible to obtain coil overlapping periods which have a fixed duration throughout the operating range.

NOR gate 30 is configured as an oscillator which provides a digital ,output illustrated at "Oscillator Output" in FIG. 2. The frequency and pulse width of the Oscillator Output is related to the waveform across capacitor 16 illustrated above the Oscillator Output in FIG. 2. The output of sequencer 38 on terminals 40 and 42 is shown at the bottom of FIG. 2. It is seen that the Oscillator Output at terminal 40 is high during the interval when inductor 12 is ON and the output at terminal 42 is high when inductor 10 is ON. The duty cycles of the output pulses on terminals 40 and 42 correspond to the period of the oscillation waveform across capacitor 16. The period of the waveform is dependent on the resonant frequency of the tank circuit, which is in turn dependent on the inductance of the selected inductor. Hence the duty cycles of the pulse outputs on terminals 40 and 42 provide an indication of the inductance of the associated inductor coils.

Figure 3:
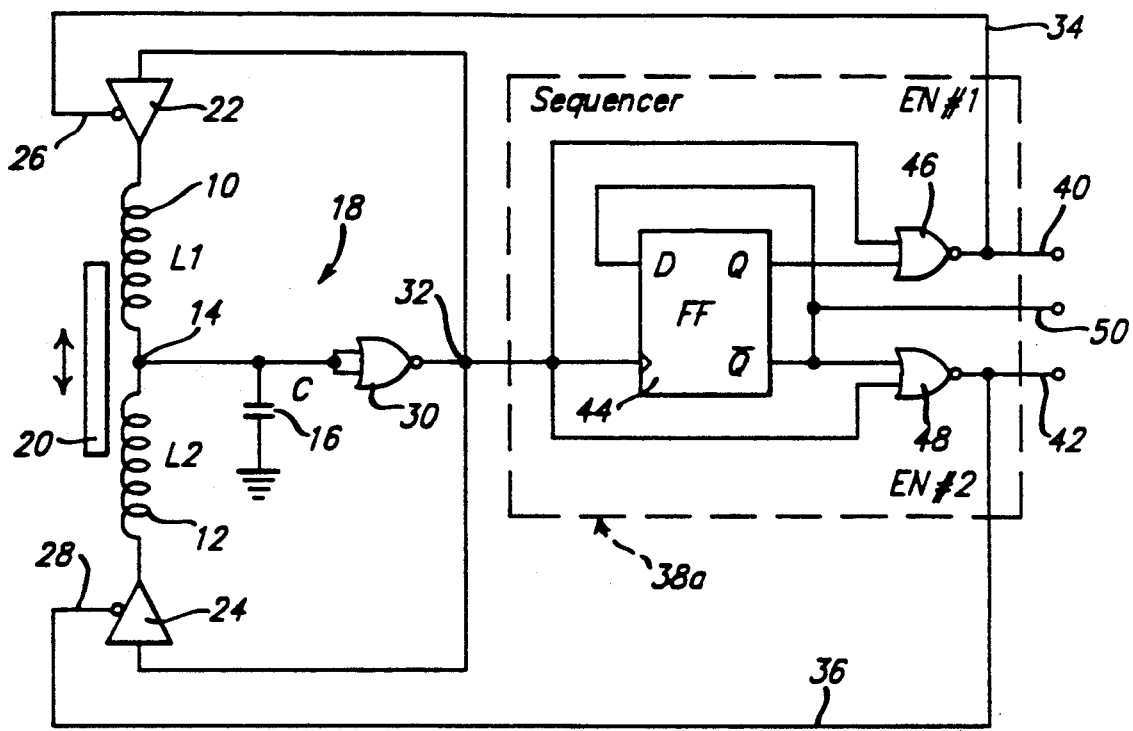
FIG. 3 is a schematic block diagram of a second embodiment of the invention.
Figure 4:
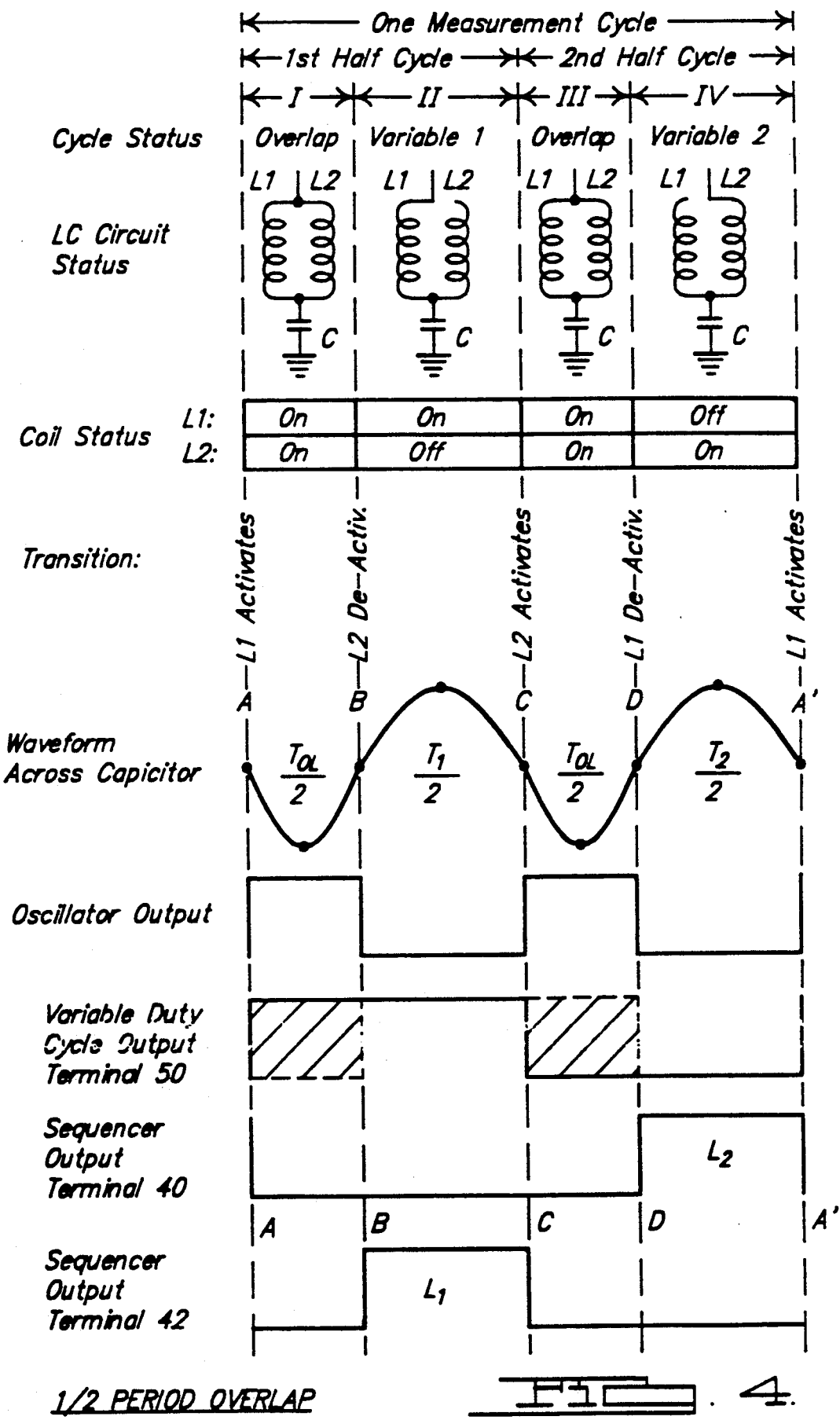
FIG. 4 is a series of waveform diagrams illustrating the operation of the second embodiment of FIG. 3.

The embodiment illustrated in FIGS. 1 and 2 the coil status switches state with each complete cycle of the waveform oscillation across capacitor 16. That is, transitions occur at alternate zero crossings (A, B, C, D ...). If desired, switching can occur after a greater number of cycles, or after completion of only a partial cycle, or switching may be tied to an external clock which is not necessarily related to the frequency of tank circuit oscilation. FIGS. 3 and 4 depict an embodiment of the invention where switching occurs every half cycle.

Referring to FIG. 3, the circuit of FIG. 1 has been modified to switch on every half cycle by using the sequencer 38a as illustrated. Specifically, the sequencer 38a employs flip-flop 44 and NOR gates 46 and 48 connected as shown. Sequencer 38a provides output terminals 40 and 42 and a center terminal 50 which is derived from the /Q output of flip-flop 44. The operation of the circuit of FIG. 3 is shown in FIG. 4, which shows two consecutive measurement half cycles comprising time sequences I-IV and which conveys similar information to that of FIG. 2. The signals on terminals 40 and 42 are similar to those of FIG. 2. The signal on center terminal 50 is a variable duty cycle output. Note that the Oscillator Output (at node 32) comprises a series of fixed duration pulses with variable spacing.

Figure 5:
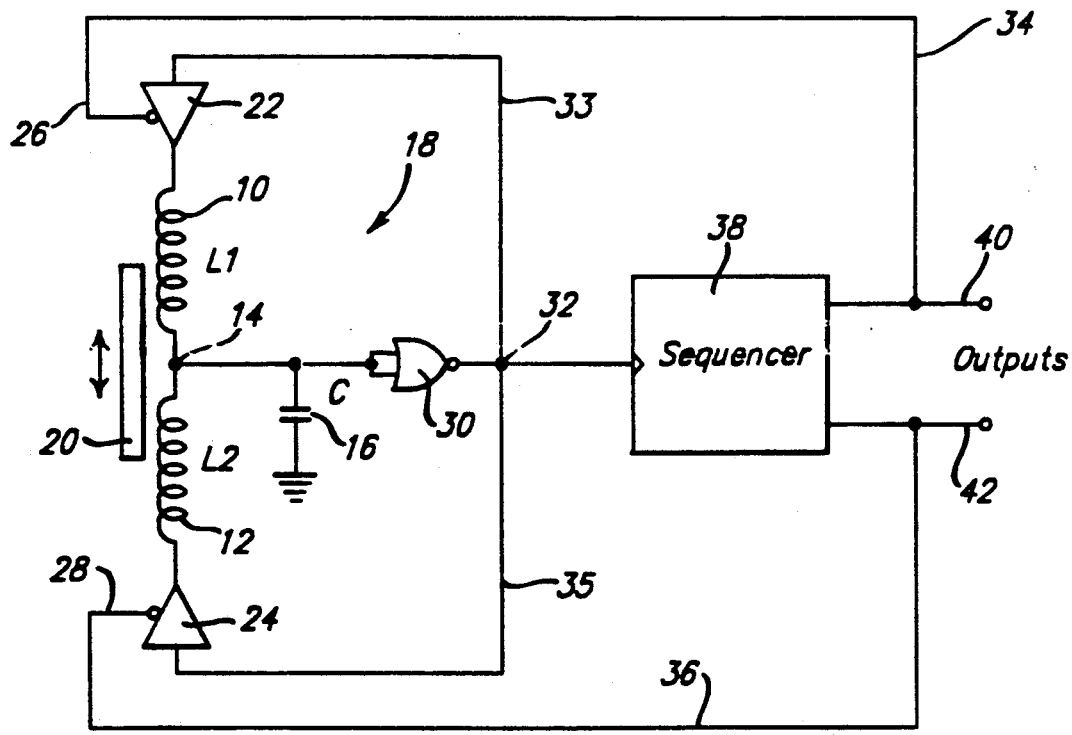
FIG. 5 is a generalized schematic block diagram of the invention.

While the invention has been illustrated using two examples, one switching every full cycle and another switching every half cycle, the invention may be implemented in other ways, as well. FIG. 5 depicts a more generalized circuit which utilizes a sequencer depicted generally at 38. The sequencer can be any type of sequence generating device including but not limited to those depicted in FIGS. 1 and 3. By appropriate construction or programming of sequencer 38, switching of the coils can occur either after a fixed number of cycles (or fractional parts of cycles) of at fixed time intervals. The staggered switching technique of the invention is equally applicable to both.

While the invention has been shown and described in connection with several presently preferred embodiments, the invention is capable of certain modification without departing from the spirit of the invention as set forth in the appended claims.

What is claimed is:

1. A method of indicating the inductance of a system of inductors including a first inductor and a second inductor, comprising:

coupling said first inductor to a tank circuit and causing said tank circuit to oscillate at a first resonant frequency determined at least in part by the inductance of said first inductor;

producing a first waveform having a property determined by said first resonant frequency;

coupling said second inductor to said tank circuit without decoupling said first inductor from said tank circuit;

decoupling said first inductor from said tank circuit without decoupling said second inductor from said tank circuit and causing said tank circuit to oscillate at a second resonant frequency determined at least in part by the inductance of said second inductor;

producing a second waveform having a property determined by said second resonant frequency;

whereby said property of said first waveform determined by resonant frequency and said property of said second waveform determined by resonant frequency are indicative of the inductance of said system, namely said property of said first waveform corresponding to the inductance of the first inductor and said property of said second waveform corresponding to the inductance of the second inductor.

2. The method of claim 1 wherein said step of coupling said second inductor to said tank circuit occurs in response to said first waveform.

3. The method of claim 1 wherein said step of decoupling said first inductor from said tank circuit occurs in response to said first waveform.

4. The method of claim 1 wherein said first waveform comprises a variable duty cycle pulse.

5. The method of claim 1 wherein said second waveform comprises a variable duty cycle pulse.

6. The method of claim 1 wherein said step of causing said tank circuit to oscillate at a first resonant frequency is performed by supplying energy to said tank circuit while said first inductor is coupled to said tank circuit.

7. The method of claim 1 wherein said step of causing said tank circuit to oscillate at a second resonant frequency is performed by supplying energy to said tank circuit while said second inductor is coupled to said tank circuit.

8. The method of claim 1 wherein said step of causing said tank circuit to oscillate at a second resonant frequency is performed by supplying energy to said tank circuit while said first inductor is coupled to said tank circuit and continuing to supply energy to said tank circuit while said second inductor is coupled to said tank circuit.

9. The method of claim 1 wherein said step of causing said tank circuit to oscillate at a second resonant frequency is performed by supplying energy to said tank circuit while said first inductor is coupled to said tank circuit, continuing to supply energy to said tank circuit when said second inductor is coupled to said tank circuit and further continuing to supply energy to said tank circuit after said first inductor is decoupled from said tank circuit.

* * * * *